United States Patent
Kitamura et al.

(10) Patent No.: US 9,564,787 B2
(45) Date of Patent: Feb. 7, 2017

(54) MOTOR INCLUDING HOUSING STRUCTURE WITH THROUGH HOLES

(71) Applicant: Nidec Corporation, Kyoto (JP)

(72) Inventors: Jumpei Kitamura, Kyoto (JP); Kazuya Ichimura, Kyoto (JP)

(73) Assignee: Nidec Corporation, Kyoto (JP)

( * ) Notice: Subject to any disclaimer, the term of this patent is extended or adjusted under 35 U.S.C. 154(b) by 122 days.

(21) Appl. No.: 14/246,298

(22) Filed: Apr. 7, 2014

(65) Prior Publication Data

US 2015/0130306 A1 May 14, 2015

(30) Foreign Application Priority Data

Nov. 13, 2013 (JP) .................. 2013-235446

(51) Int. Cl.
| | | |
|---|---|---|
| *H02K 9/00* | (2006.01) | |
| *H02K 9/06* | (2006.01) | |
| *H02K 5/00* | (2006.01) | |
| *H02K 5/20* | (2006.01) | |

(52) U.S. Cl.
CPC . *H02K 9/06* (2013.01); *H02K 5/20* (2013.01)

(58) Field of Classification Search
CPC ............ H02K 9/00; H02K 9/06; H02K 11/00
USPC .................. 310/60 R, 62, 89, 63
See application file for complete search history.

(56) References Cited

U.S. PATENT DOCUMENTS

| | | | | |
|---|---|---|---|---|
| 4,406,959 A | * | 9/1983 | Harano ................... | H02K 9/20 165/104.25 |
| 2007/0273221 A1 | * | 11/2007 | Kinoshita ................ | H02K 3/50 310/58 |
| 2009/0026859 A1 | * | 1/2009 | Kinoshita .............. | H02K 3/522 310/71 |
| 2009/0224617 A1 | * | 9/2009 | Bottger .................. | H02K 1/146 310/89 |
| 2010/0148602 A1 | * | 6/2010 | Parra ...................... | H02K 5/124 310/63 |

FOREIGN PATENT DOCUMENTS

| | | |
|---|---|---|
| JP | 01-110035 A | 4/1989 |
| JP | 02-174528 A | 7/1990 |
| JP | 05-103443 A | 4/1993 |
| JP | 2005102370 A * | 4/2005 |

* cited by examiner

*Primary Examiner* — Jose Gonzalez Quinones
(74) *Attorney, Agent, or Firm* — Keating & Bennett, LLP

(57) ABSTRACT

A motor includes an impeller including a plurality of blades arranged in a circumferential direction and fixed to a shaft between a cover portion and an armature. The cover portion includes at least one cover portion through hole arranged to axially overlap with the blades. A cylindrical portion includes at least one cylindrical portion through hole arranged to radially overlap with the blades.

10 Claims, 6 Drawing Sheets

MOTOR INCLUDING HOUSING STRUCTURE WITH THROUGH HOLES

BACKGROUND OF THE INVENTION

1. Field of the Invention

The present invention relates to an inner-rotor motor.

2. Description of the Related Art

There has been a demand for an increase in power of inner-rotor DC motors. Inner-rotor DC motors are used in applications such as vacuum cleaners, washing machines, and food processors. Vacuum cleaners or the like particularly require a motor with a high rotation rate, and it is therefore difficult to improve specifications (e.g., high speed rotation, high torque, etc.) of the motor of the vacuum cleaner or the like because of a generation of heat in an armature thereof. DC motors have been increasingly reduced in size because of market demand, and it is considered to be primarily important to provide small-sized DC motors which have specifications equivalent to those of existing larger DC motors.

JP-A 2-174528 discloses a permanent magnet rotor 1 in which blades 6 are arranged while holes are defined in a housing 7 of a motor in which the permanent magnet rotor 1 is included.

JP-A 1-110035 discloses a brushless motor in which fins 30 are arranged to cause winds to pass from cooling air inlets 28 arranged at an axially upper end to cooling air outlets 29 arranged at an axially lower end.

However, the techniques described in JP-A 2-174528 and JP-A 1-110035 do not overcome a problem in that it is difficult to force air into the motor when atmospheric pressure has become increased in the vicinity of an armature.

SUMMARY OF THE INVENTION

A motor according to a preferred embodiment of the present invention includes a bearing portion; a shaft arranged along a central axis extending in a vertical direction, and rotatably supported by the bearing portion; a rotor magnet arranged to rotate together with the shaft; an armature arranged radially outside the rotor magnet; a circuit board held on an axially lower side of the armature, and arranged to supply electricity to the armature; a bracket including a cover portion arranged to support the bearing portion, and a cylindrical portion arranged to extend downward from a radially outer edge of the cover portion, and including an inner circumferential surface supported by the armature; and an impeller including a plurality of blades arranged in a circumferential direction and being fixed to the shaft between the cover portion and the armature. The cover portion includes at least one cover portion through hole arranged to axially overlap with the blades. The cylindrical portion includes at least one cylindrical portion through hole arranged to radially overlap with the blades. Each blade is a pitched blade including an upper edge and a lower edge arranged at different circumferential positions.

Preferred embodiments of the present invention make it easier to supply a cooling air into a motor, and thereby improve a capability to cool the motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction in which a central axis of a motor extends, and that a side on which a circuit board is arranged with respect to a stator core is defined as a lower side. The shape of each member or portion and relative positions of different members or portions will be described based on the above assumptions. It should be noted, however, that the above definitions of the vertical direction and the upper and lower sides are made simply for the sake of convenience in description, and should not be construed to restrict in any way the orientation of a motor according to any preferred embodiment of the present invention when in use.

A motor 1 according to the present preferred embodiment of the present invention is preferably, for example, installed in a household electrical appliance, such as an air conditioner, an air purifier, or a refrigerator, and is used as a driving source of a fan or a pump. Alternatively, the motor 1 according to the present preferred embodiment may be used as a driving source of industrial equipment, such as, for example, a sorter. Note that motors according to other preferred embodiments of the present invention may be used for other purposes. For example, motors according to other preferred embodiments of the present invention may be installed in an office automation appliance, a medical appliance, an automobile, and the like, and be used to generate a variety of driving forces. Hereinafter, a device in which the motor 1 is installed is referred to as a "drive apparatus".

Figure 1:
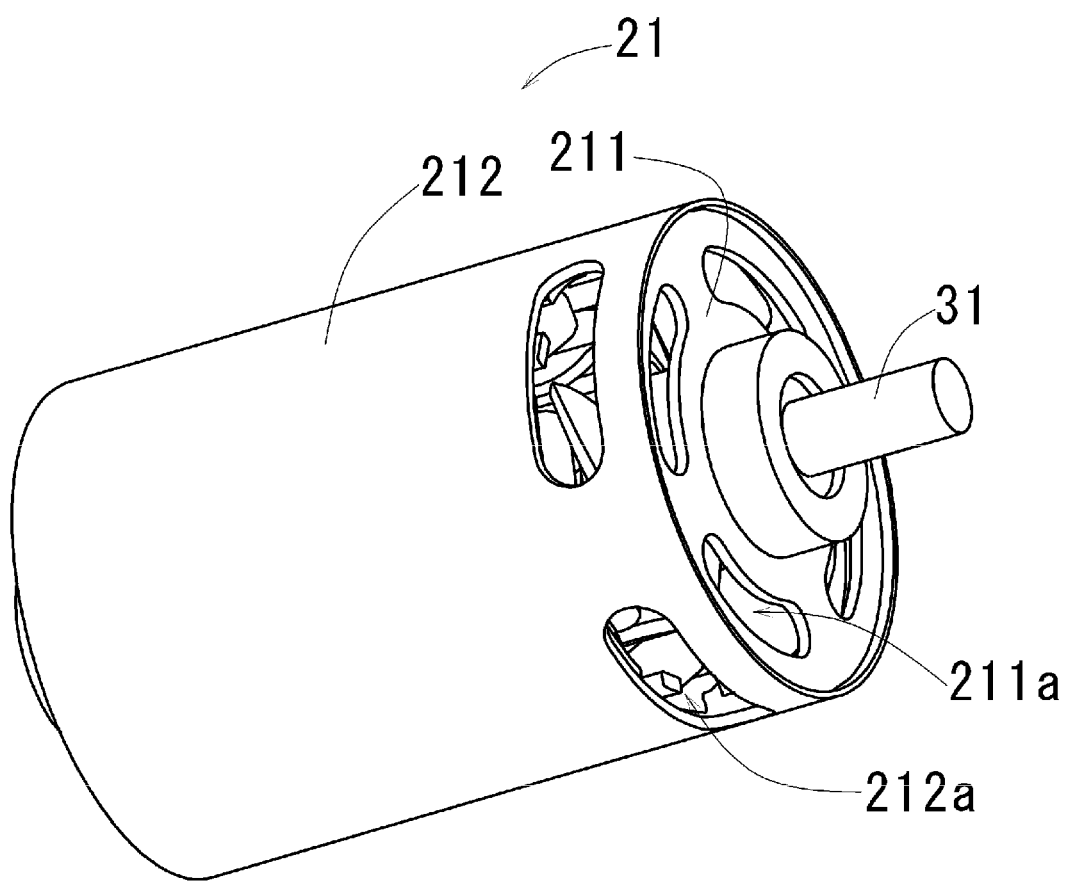
FIG. 1 is a perspective view of an external appearance of a motor according to a preferred embodiment of the present invention.
Figure 2:
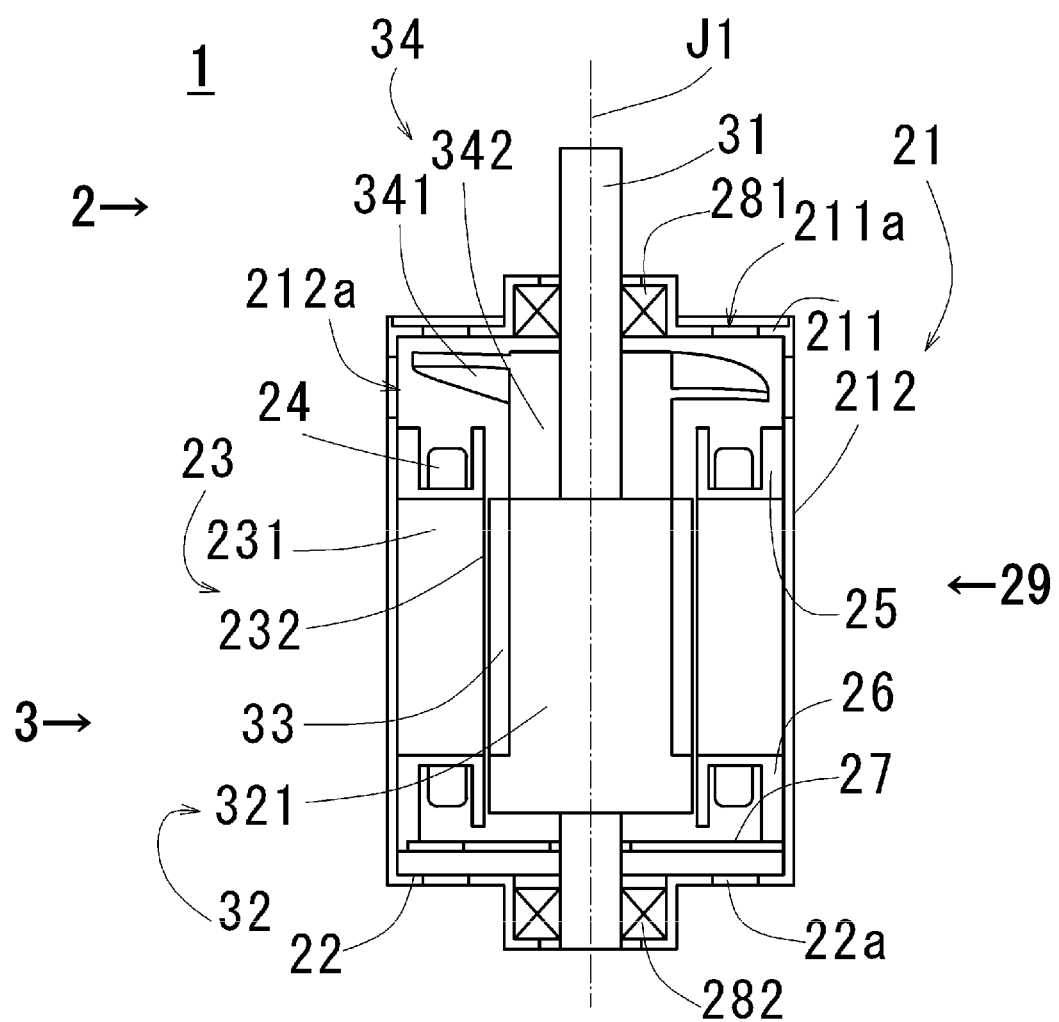
FIG. 2 is a cross-sectional view of the motor according to a preferred embodiment of the present invention.

FIG. 1 is a perspective view of an external appearance of the motor 1 according to the present preferred embodiment. FIG. 2 is a cross-sectional view of the motor 1. Referring to FIGS. 1 and 2, the motor 1 includes a stationary portion 2 and a rotating portion 3. The stationary portion 2 is fixed to a frame of the drive apparatus (not shown). The rotating portion 3 is supported to be rotatable with respect to the stationary portion 2.

The stationary portion 2 according to the present preferred embodiment preferably includes a bracket 21, a stator core 23, coils 24, an upper insulator 25, a lower insulator 26, a circuit board 27, and a bearing portion 28.

The bracket 21 is arranged to hold the stator core 23 and the bearing portion 28 (i.e., an upper bearing 281 and a lower bearing 282). The bracket 21 is preferably has a covered cylinder shape or substantially a covered cylinder shape. The bracket 21 preferably includes a cover portion 211 and a cylindrical portion 212. The bracket 21 is preferably made of a metal, for example, but could be made of any other desirable type of material. The bracket 21 is preferably formed using a so-called die-casting process, for example. Specifically, the bracket 21 is obtained by melting a metal including zinc, for example, as a main component, and pouring the molten metal into a mold. Note that the metal may not necessarily include zinc, but may include aluminum or other types of metals. Also note that the bracket 21 may not necessarily be produced by the die-casting process, but may be processed by another desirable processing method, such as, for example, press working. Also note that the bracket 21 may not necessarily be made of the metal, but may be made of a resin.

The stator core 23 and the coils 24 function as an armature of the motor 1. The stator core 23 is preferably defined by laminated steel sheets, that is, electromagnetic steel sheets, such as, for example, silicon steel sheets, placed one upon another in an axial direction. The axial direction is herein assumed to be a direction parallel or substantially parallel to a central axis J1 of the motor 1. The stator core 23 preferably includes an annular core back 231 and a plurality of magnetic pole teeth 232 arranged to project radially inward from the core back 231. A portion of each magnetic pole tooth 232 of the stator core 23 around which the coil 24 is wound is preferably arranged to have a circumferential width equal to or smaller than twice the radial width of the core back 231. In the present preferred embodiment, the number of magnetic pole teeth 232 preferably is six, for example.

Each coil 24 is preferably defined by a conducting wire wound around a separate one of the magnetic pole teeth 232. The coil 24 is wound around the magnetic pole tooth 232 with the upper and lower insulators 25 and 26 intervening therebetween. In the present preferred embodiment, the conducting wires are preferably connected in a so-called star configuration. Therefore, four end portions of the conducting wires used as a U phase, a V phase, a W phase, and common, respectively, are drawn out from the coils 24. Each of the drawn end portions is preferably soldered to the circuit board 27. Once drive currents are supplied to the coils 24 through the circuit board 27, radial magnetic flux is generated around each of the magnetic pole teeth 232, each of which includes a magnetic core. Then, interaction between the magnetic flux of the magnetic pole teeth 232 and that of a rotor magnet 33 included in the rotating portion 3 produces a circumferential torque, so that the rotating portion 3 is caused to rotate about the central axis J1 with respect to the stationary portion 2.

Each of the upper and lower insulators 25 and 26 is preferably a member made of, for example, a resin and configured to provide electrical isolation between the stator core 23 and each coil 24. The upper insulator 25 is arranged axially above the stator core 23. The lower insulator 26 is arranged axially below the stator core 23. In other words, the stator core 23 is arranged between the upper and lower insulators 25 and 26. The upper insulator 25 is arranged to cover an upper surface of each magnetic pole tooth 232. The lower insulator 26 is arranged to cover a lower surface of each magnetic pole tooth 232. Moreover, the upper and lower insulators 25 and 26 are arranged to together cover a side surface of each magnetic pole tooth 232. The upper and lower insulators 25 and 26 together define an entire insulator of the stator core 23. In the present preferred embodiment, the coils 24 are wound around the respective magnetic pole teeth 232 with the upper and lower insulators 25 and 26 intervening therebetween, so that the insulator is fixed to the stator core 23.

Each of the upper and lower insulators 25 and 26 include portions arranged to intervene between the magnetic pole teeth 232 and the coils 24 to provide electrical isolation between the magnetic pole teeth 232 and the coils 24. An assembly defined by the stator core 23, the coils 24, the upper insulator 25, and the lower insulator 26 corresponds to an armature 29.

Figure 3:
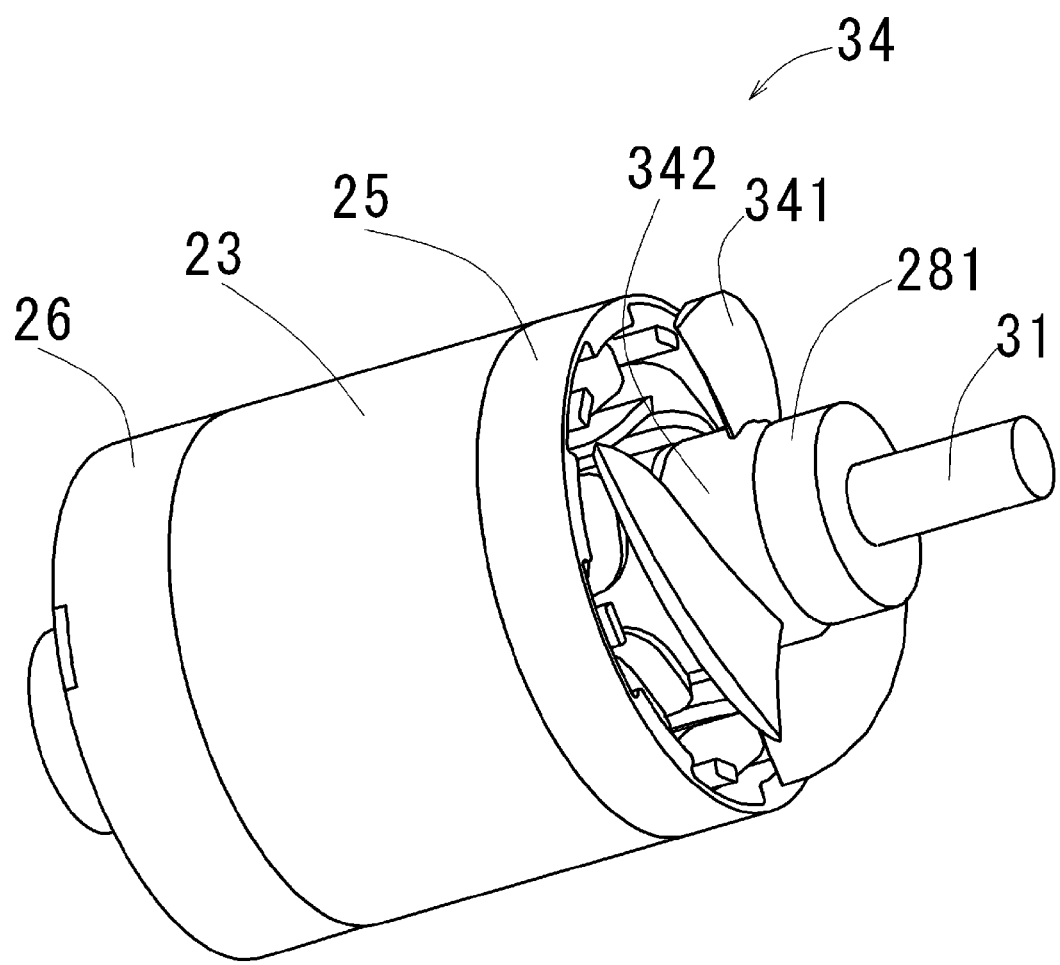
FIG. 3 is a perspective view of the external appearance of the motor according to a preferred embodiment of the present invention with a bracket removed from the motor.
Figure 4:
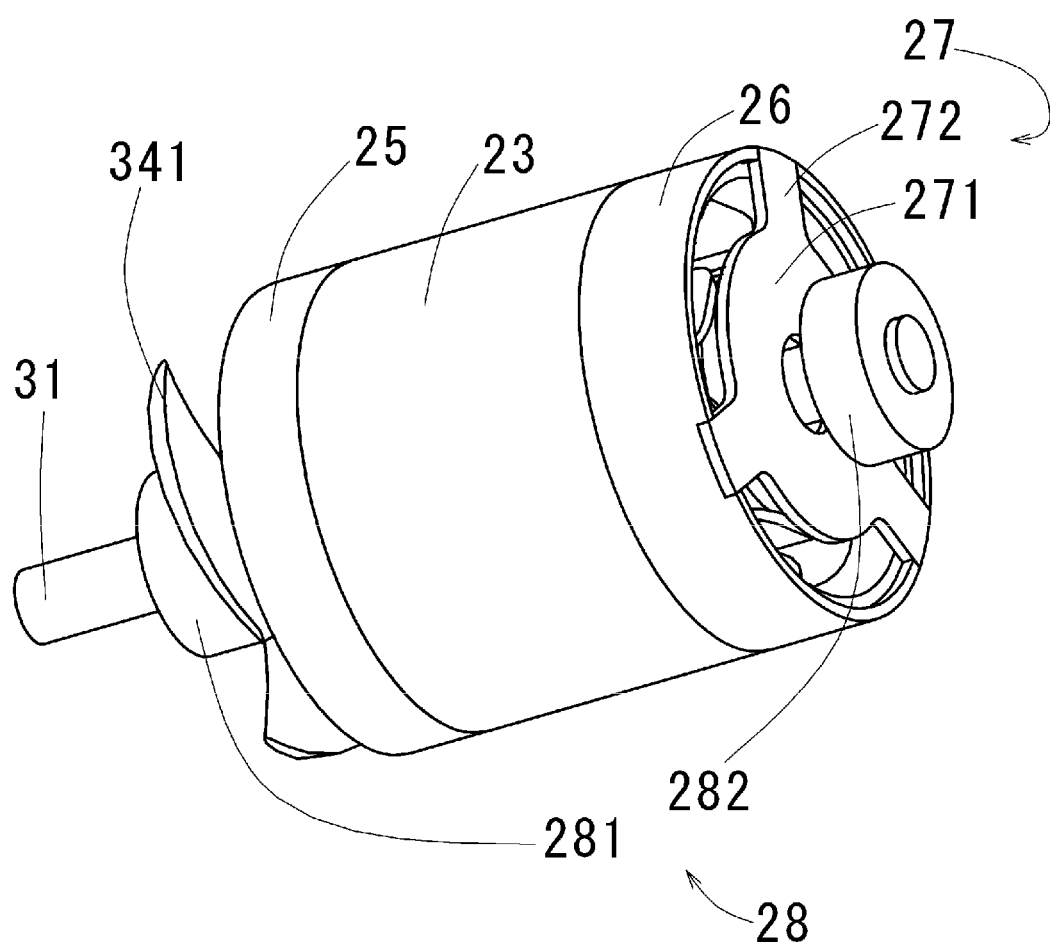
FIG. 4 is a perspective view of the external appearance of the motor according to a preferred embodiment of the present invention with the bracket removed from the motor when viewed from a different angle.

FIG. 3 is a perspective view of the external appearance of the motor 1 according to the present preferred embodiment with the bracket 21 removed from the motor 1. FIG. 4 is a perspective view of the external appearance of the motor 1 with the bracket 21 removed from the motor 1 when viewed from a different angle. Referring to FIG. 4, the circuit board 27 is a board on which a wiring is configured to supply the drive currents from an external power supply to the coils 24. The circuit board 27 is defined by an annular portion 271 centered around a shaft 31, and preferably three, for example, support portions 272 each of which is arranged to extend radially outward from the annular portion 271. It is noted that any other desirable number of support portions 272 could be used. An outer circumference of each support portion 272 of the circuit board 27 is preferably arranged at the same or substantially the same radial position as that of an outer circumference of the lower insulator 26.

Referring to FIG. 2, the bearing portion 28 is a member arranged to rotatably support the shaft 31 of the rotating portion 3. The bearing portion 28 preferably is defined by the upper and lower bearings 281 and 282. The upper bearing 281 is held by an inner surface of the cover portion 211 of the bracket 21. The lower bearing 282 is held by a bottom portion 22 of the bracket 21. Ball bearings each of which includes an outer race and an inner race which rotate relative to each other through balls are preferably used as the bearing portion 28, for example. Note that any other type of bearing, such as, for example, a plain bearing, a fluid bearing, or the like, may be used as the bearing portion 28.

The rotating portion 3 according to the present preferred embodiment preferably includes the shaft 31, a rotor holder 32, and the rotor magnet 33. The shaft 31 is a columnar or substantially columnar member arranged to extend in the vertical direction along the central axis J1. The shaft 31 is arranged to rotate about the central axis J1 while being supported by the above-described bearing portion 28. An upper end portion of the shaft 31 is arranged to project upward above the upper bearing 281. One of a lower end portion and an upper end portion of the shaft 31 is preferably joined to a driving portion of the drive apparatus through a power transmission mechanism, such as, for example, a gear. Note that the driving portion of the drive apparatus may be directly driven by the shaft 31.

The rotor holder 32 is preferably a member arranged to rotate together with the shaft 31 radially inside the stator core 23 and the coils 24. The rotor holder 32 according to the present preferred embodiment is preferably made by free-cutting steel, for example. That is, the rotor holder 32 is preferably shaped by cutting. The rotor holder 32 preferably includes a magnet support portion 321. The magnet support portion 321 is arranged in an axial middle of the rotor holder 32, and the shaft 31 is press fitted to an inner circumferential surface of the magnet support portion 321. Note that the magnet support portion 321 may be included in the shaft 31.

The rotor holder 32 according to the present preferred embodiment preferably is T-shaped or substantially T-shaped when viewed in a section. Note, however, that this is not essential to the present invention and any other desirable shape could be used. The rotor holder 32 may be arranged to have a simple cylindrical shape. Also, the rotor holder 32 may alternatively have a covered cylinder shape or substantially a covered cylinder shape, and may be produced by press working, for example. Also, the rotor holder 32 may be defined by laminated magnetic steel sheets, for example. Also, the rotor holder 32 may be produced by sintering, for example. Also, the rotor holder 32 may be produced by combining a component defined by laminated magnetic steel sheets and a component having a covered cylinder shape or substantially a covered cylinder shape, and may be produced by press working, for example. Although a rotor according to the present preferred embodiment preferably is a rotor of a so-called SPM (Surface Permanent Magnet) type, this is not essential to the present invention and any other desirable type of rotor could be provided instead. A rotor of a so-called IPM (Interior Permanent Magnet) type may be used, for example. In the case where the rotor of the IPM type is used, it is preferable that the rotor holder 32 should be defined by laminated magnetic steel sheets.

The rotor magnet 33 is preferably cylindrical in shape, and is fixed to an outer circumferential surface of a tubular portion of the rotor holder 32. A radially outer surface of the rotor magnet 33 defines a pole surface arranged radially opposite the stator core 23 and the coils 24. The rotor magnet 33 is polarized such that north pole surfaces and south pole surfaces are arranged alternately in the circumferential direction. Note that, in place of the cylindrical rotor magnet 33, a plurality of magnets may be arranged such that north poles and south poles alternate with each other in the circumferential direction. Also note that the rotor magnet 33 may be embedded in the rotor holder 32 while the rotor of the IPM type is used as mentioned above.

Figure 5:
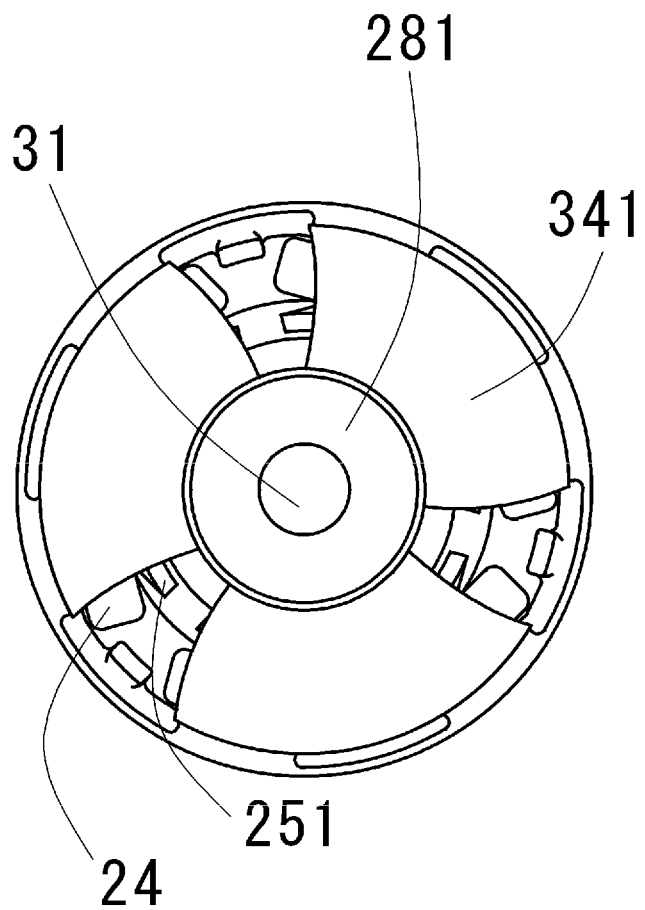
FIG. 5 is a front view of the motor according to a preferred embodiment of the present invention with the bracket removed from the motor.
Figure 6:
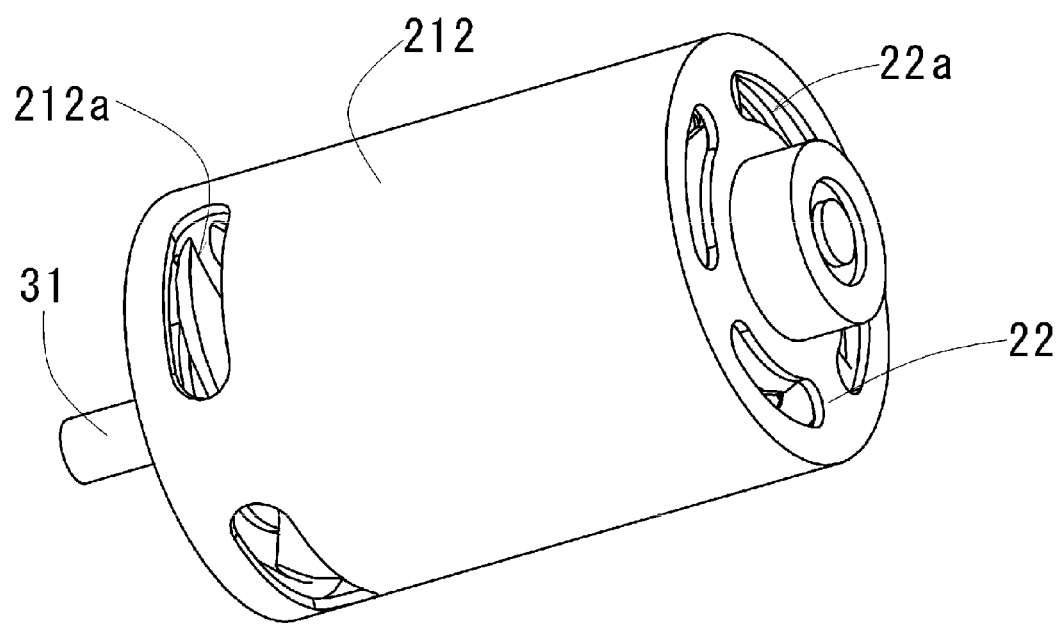
FIG. 6 is a perspective view of the external appearance of the motor according to a preferred embodiment of the present invention when viewed from a different angle.

FIG. 5 is a front view of the motor 1 with the bracket 21 removed from the motor 1. FIG. 6 is a perspective view of the external appearance of the motor 1 when viewed from a different angle. Referring also to FIGS. 1 to 4, an interior of the motor 1 will be described below.

An impeller 34 is preferably fixed to the shaft 31 between the cover portion 211 and the armature 29. The impeller 34 includes a plurality of blades 341 arranged in the circumferential direction. The cover portion 211 of the bracket 21 preferably includes cover portion through holes 211*a* arranged to axially overlap with the blades 341. The cylindrical portion 212 of the bracket 21 preferably includes cylindrical portion through holes 212*a* arranged to radially overlap with the blades 341. Each blade 341 is preferably a pitched blade including an upper edge and a lower edge arranged at different circumferential positions.

Once the motor 1 is caused to rotate in one direction, the impeller 34 rotates to cause air to be suctioned in through each of the cover portion through holes 211*a* and the cylindrical portion through holes 212*a*, and to flow toward a stator. While the impeller 34 continues to rotate, atmospheric pressure inside the motor 1 gradually increases, making it less easy for a wind to flow into the motor 1. Thereafter, the air flows backward and is discharged out of the motor 1 through each cylindrical portion through hole 212*a*. This action establishes a channel through which the air suctioned in through any cover portion through hole 211*a* flows to each cylindrical portion through hole 212*a*. As a result, a negative pressure is produced in the vicinity of this channel, and the air inside the motor 1 is caused to flow out of the motor 1 through each cylindrical portion through hole 212*a*. Then, the atmospheric pressure inside the motor 1 decreases, and a wind is caused to flow into the motor 1. This cycle is repeated at short time intervals, reducing the probability of a phenomenon of the air stagnating because of the atmospheric pressure inside the motor 1. In addition, the impeller 34 is arranged to press the air inward inside the motor 1 with great strength over an entire radial extent of each blade 341, making it possible to discharge the air flowing backward radially outward through a centrifugal force. Further, since a windage loss that occurs during the rotation is small, efficiency of the motor 1 is improved by cooling. Furthermore, interference between the cylindrical portion through holes 212*a* and the blades 341 is so limited that an occurrence of a loud noise is significantly reduced or prevented. (In the case of a centrifugal fan, when only a small amount of air is suctioned in through each cover portion through hole 211*a*, a force which presses a wind into the motor 1 is weak.)

The cover portion through holes 211*a* according to the present preferred embodiment are preferably provided as a plurality of holes arranged in the circumferential direction. This arrangement promotes a flow of the air. Moreover, each cover portion through hole 211*a* preferably includes rounded edges. This arrangement contributes to reducing or preventing a noise caused by interference between the cover portion through hole 211*a* and the blades 341.

The cylindrical portion through holes 212*a* according to the present preferred embodiment are also preferably a plurality of holes arranged in the circumferential direction. This arrangement promotes the flow of the air. Moreover, each cylindrical portion through hole 212*a* preferably includes rounded edges. This arrangement contributes to reducing or preventing a noise caused by interference between the cylindrical portion through hole 212*a* and the blades 341.

In the present preferred embodiment, the cover portion through holes 211*a* and the cylindrical portion through holes 212*a* preferably are arranged to radially overlap with each other. The air suctioned in through the cover portion through holes 211*a* is discharged through the cylindrical portion through holes 212*a*, and adoption of the above arrangement makes it easier for the air to pass inside the motor 1, and for a negative pressure region to occur inside the motor 1. This makes it easier for the air stagnating inside the motor 1 to be discharged out of the motor 1. In other words, regions where no cover portion through holes 211*a* are defined are arranged to radially overlap with regions where no cylindrical portion through holes 212*a* are defined.

Each of the cover portion through holes 211*a* and the cylindrical portion through holes 212*a* according to the present preferred embodiment preferably is a hole whose longitudinal direction is parallel or substantially parallel to the circumferential direction. This arrangement allows each through hole to be defined along a flow of the wind, increasing efficiency with which the air is suctioned in and is discharged.

In the present preferred embodiment, a radially outer edge portion of each blade 341 is preferably arranged radially outward of an inner circumferential surface of the core back 231. This arrangement causes a radially outermost end of the impeller 34 to axially overlap with the core back 231. Accordingly, a flow of air caused by rotation of the radially outermost end of the impeller 34 preferably contributes more to discharging the air out of the motor 1 through the cylindrical portion through holes 212*a* than to pressing the air inward inside the motor 1. This enables the above-described cycle to be more smoothly repeated, resulting in an improvement in a capability to cool the motor 1.

The impeller 34 according to the present preferred embodiment includes a cylindrical blade support portion 342 arranged to support the blades 341. The blades 341 are arranged to project radially outward from the blade support portion 342. This arrangement preferably contributes to preventing hindrance to an axial flow of a wind caused by rotation of the impeller 34.

In the present preferred embodiment, the shaft 31 preferably includes the magnet support portion 321 arranged to support the rotor magnet 33, the blade support portion 342 is arranged to extend toward the magnet support portion 321, and a lower end of the blade support portion 342 is arranged at an axial level lower than that of an upper end of the armature 29. This arrangement contributes to preventing the axial flow of the wind caused by the rotation of the impeller 34 from stagnating below the impeller 34, and to smoothing a downward flow of the wind.

In the present preferred embodiment, the lower end of the blade support portion 342 is preferably arranged to be in contact with an upper end of the magnet support portion 321. This arrangement contributes to increasing the flow velocity of the axial flow of the wind caused by the rotation of the impeller 34 in accordance with Bernoulli's principle. Here, the cross-sectional area of a channel defined between the rotor and the core back 231 is smaller than the cross-sectional area of a channel defined between the bracket 21 and the blade support portion 342, and since there is no halfway point at which the cross-sectional area of the channel increases, the flow velocity increases in a stepwise manner. Additionally, the blade support portion 342 may be arranged radially opposite the coils 24. Further, the blade support portion 342 may be arranged radially opposite from a projection arranged to prevent a collapse of each coil 24 (i.e., a projection arranged radially inside each coil 24).

In the present preferred embodiment, the bracket 21 preferably includes the bottom portion 22 arranged below the armature 29, and the bottom portion 22 includes a plurality of bottom portion through holes 22a arranged to axially overlap with the armature 29. This arrangement contributes to reducing an increase in the pressure inside the motor 1 during the rotation of the impeller 34, and to establishing an environment in which the wind is able to easily flow.

In the present preferred embodiment, a lower edge of each cylindrical portion through hole 212a is preferably arranged at an axial level lower than that of a lower edge of each blade 341. This allows the air to be easily discharged out of the motor 1 during rotation of the blades 341. In addition, an upper edge of each cylindrical portion through hole 212a is arranged at an axial level lower than that of an upper edge of each blade 341. In the case where the upper edge of each cylindrical portion through hole 212a is arranged at an axial level higher than that of the upper edge of each blade 341, the proportion of the amount of air suctioned in through the cylindrical portion through hole 212a to the amount of air suctioned in or discharged through the cylindrical portion through hole 212a is increased. A region above the blades 341 makes only a limited contribution to the discharge of the air. Moreover, a radially outer end edge of each cover portion through hole 211a is arranged radially inward of an outer edge of each blade 341. Adoption of this arrangement makes it easier for a negative pressure to be produced in the vicinity of each cover portion through hole 211a, making it possible to maintain efficiency with which the air is suctioned in at a high axial level.

While preferred embodiments of the present invention have been described above, it will be understood that the present invention is not limited to the above-described preferred embodiments.

While the motor 1 according to the above-described preferred embodiment preferably is a three-phase brushless motor, for example, this is not essential to the present invention. Motors according to other preferred embodiments of the present invention may be single-phase or two-phase brushless motors, brushed motors including brushes and commutators, or other types of motors, such as, for example, stepping motors.

Note that features of the above-described preferred embodiments and the modifications thereof may be combined appropriately as long as no conflict arises.

Various preferred embodiments of the present invention are applicable to inner-rotor motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a bearing portion;
   a shaft extending along a central axis extending in a vertical direction, and rotatably supported by the bearing portion;
   a rotor magnet configured to rotate together with the shaft;
   an armature located radially outside the rotor magnet;
   a circuit board held on an axially lower side of the armature, and configured to supply electricity to the armature;
   a bracket including a bottom portion and a cover portion both configured to support the bearing portion, and a cylindrical portion extending downward from a radially outer edge of the cover portion, and including an inner circumferential surface supported by the armature; and
   an impeller including a plurality of blades arranged in a circumferential direction, and fixed to the shaft between the cover portion and the armature; wherein
   the cover portion includes at least one cover portion through hole arranged to axially overlap with the blades, the at least one cover portion through hole defining an inlet permitting air to enter into the motor;
   the bottom portion includes at least one bottom portion through hole defining a first outlet permitting air to exit the motor;
   the cylindrical portion includes at least one cylindrical portion through hole arranged to radially overlap with the blades, the at least one cylindrical portion through hole defining a second outlet permitting air to exit the motor;
   each blade is a pitched blade including an upper edge and a lower edge arranged at different circumferential positions;
   the circuit board includes portions directly opposed to a rotor core which supports the rotor magnet without any intervening member being provided between the circuit board and the rotor core; and
   the circuit board includes three equidistant projections which connect the circuit board to an insulator of the armature at three points.

2. The motor according to claim 1, wherein the at least one cover portion through hole includes a plurality of holes arranged in the circumferential direction.

3. The motor according to claim 2, wherein the at least one cylindrical portion through hole includes a plurality of holes arranged in the circumferential direction.

4. The motor according to claim 1, wherein the at least one cover portion through hole and the at least one cylindrical portion through hole radially overlap with each other.

5. The motor according to claim 1, wherein each of the at least one cover portion through hole and the at least one cylindrical portion through hole is in a shape of a hole whose longitudinal direction is parallel or substantially parallel to the circumferential direction.

6. The motor according to claim 1, wherein
the armature includes:
   a stator core including an annular core back and a plurality of magnetic pole teeth projecting radially inward from the core back;
   an insulator covering at least an upper surface and a lower surface of each magnetic pole tooth of the stator core; and
   coils each of which is defined by a conducting wire wound around a separate one of the magnetic pole teeth with the insulator intervening therebetween; and
   a radially outer edge portion of each blade is located radially outward of an inner circumferential surface of the core back.

7. The motor according to claim 1, wherein
the impeller includes a cylindrical blade support portion configured to support the blades; and
the blades project radially outward from the blade support portion.

8. The motor according to claim 7, wherein
the shaft includes a magnet support portion configured to support the rotor magnet; and
the blade support portion extends toward the magnet support portion, and an axially lower end of the blade support portion is arranged at an axial level lower than an axial level of an axially upper end of the armature.

9. The motor according to claim 8, wherein the axially lower end of the blade support portion is in contact with an axially upper end of the magnet support portion.

10. The motor according to claim 1, wherein
the bracket includes a bottom portion arranged axially below the armature; and
the bottom portion includes a bottom portion through hole arranged to axially overlap with the armature.

* * * * *